United States Patent Office 3,741,739
Patented June 26, 1973

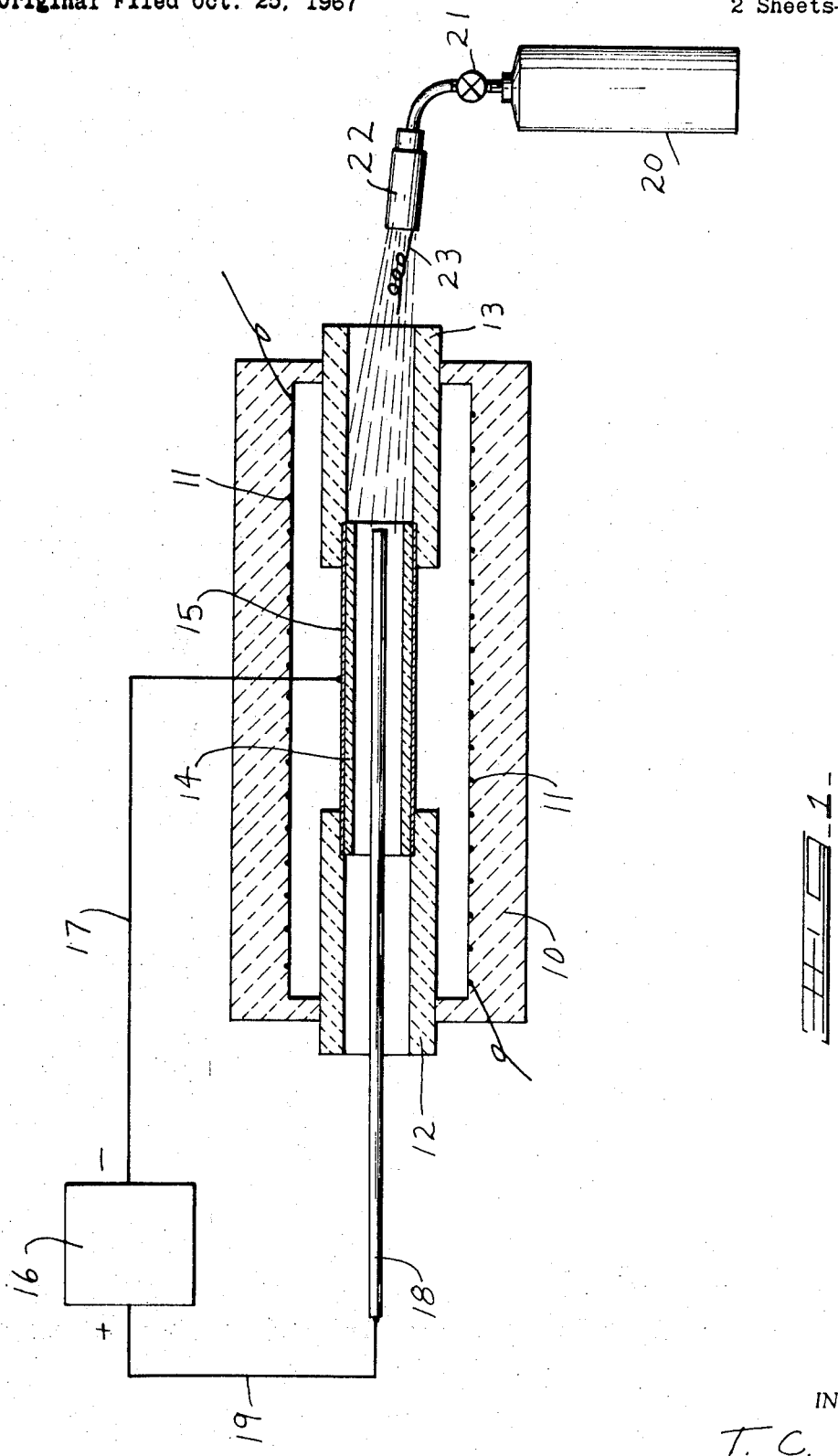

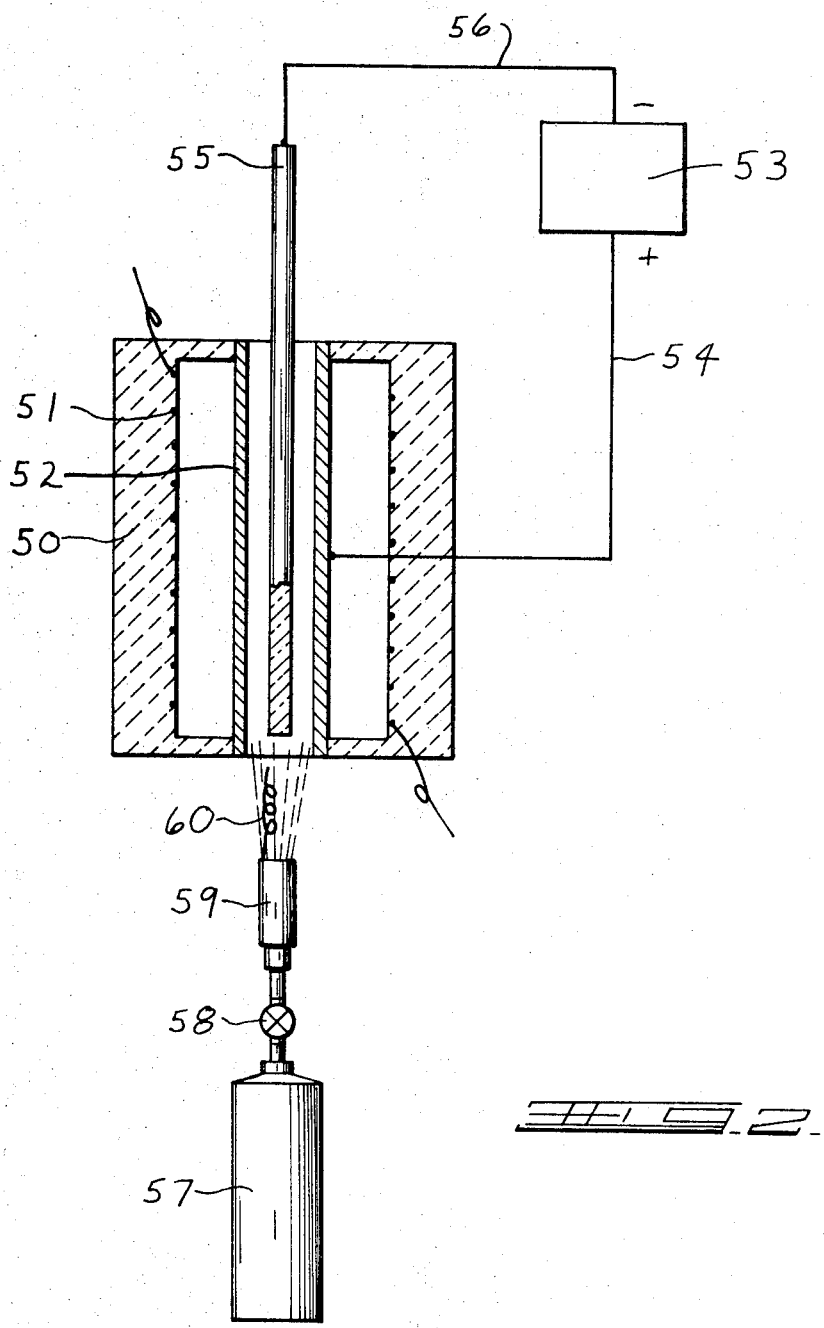

3,741,739
METHOD OF STRENGTHENING GLASS
Theodore C. Baker, Wayne, Ohio, assignor to
Owens-Illinois, Inc.
Continuation of application Ser. No. 678,034, Oct. 25,
1967. This application July 7, 1970, Ser. No. 56,153
Int. Cl. C03b 5/26, 25/00
U.S. Cl. 65—30    8 Claims

ABSTRACT OF THE DISCLOSURE

A method for electrochemically tempering an alkali silicate glass article by an ion exchange process wherein larger alkali ions from an electrically conductive, gaseous medium are exchanged for the alkali ions present in the surface of the glass article.

This is a continuation of copending application Ser. No. 678,034, filed Oct. 25, 1967, now abandoned, which is incorporated herein and relied on.

This invention relates to a method of increasing the mechanical strength of glass articles. More particularly, the present invention pertains to a method of strengthening silicate glasses containing alkali oxides through an electrochemical tempering process.

In devising methods of increasing the strength of glass articles, two basic factors must be considered: (1) glass always fails in tension stress, and (2) glass fractures generally originate at the surface. Accordingly, presently known methods of strengthening glass articles are based on the formation of a compressive stress layer at the surface of the article. In theory then, before fracture can occur, the compressive stress must be overcome. For example, if a surface compressive stress of 1,000 p.s.i. were present, the strength of the body would theoretically be increased by 1,000 p.s.i., in the absence of other factors. Unfortunately, this simple relationship does not always control, and other variables such as geometry of the glass article, and the presence of surface flaws and defects, often cause additional problems.

Methods of strengthening glass articles by effectuating a permanent surface compressive stress are known in the art. In one such process known as thermal tempering, rapid quenching of the hot glass article establishes high surface compression, counter-balanced by high interior tension which results in increased strength as long as the compression layer is not penetrated. While this process is quite economical, there are several practical limitations. For instance, since the amount of permanent compressive surface stress (and therefore the strength increase) is proportional to the temperature gradient that can be induced throughout the cross section of the article under non-equilibrium conditions, there are several processing difficulties. Since the strengthening effect is proportional to the amount a surface compressive stress that can be generated, the amount of strengthening realized is effectively limited.

Consequently, other means for inducing permanent surface compressive stresses were developed.

Generally, these methods comprise inducing surface compressive stress through thermo-chemical rather than physical means. In the simplest expression of this technique, alkali ions in the glass surface are replaced by a different alkali ion from an external source. The relative sizes of the alkali ion exchange pairs are preselected so that the ion exchanged surface layer of the glass article will be in compression when the treated glass article is cooled to room temperature.

The above process has been practiced at least experimentally, in two distinct methods of application. In one method described in U.S. Pat. No. 2,779,136 the alkali ion from the external source is lithium, the alkali ion in the glass is sodium, and the ion exchange is carried out at a temperature that is above the strain point and below the softening temperature of the glass to produce a glass surface layer that will be in compression and the main body of the glass in tension when the glass article is cooled to room temperature. There are some disadvantages to the above method. For instance, this process requires a relatively high processing temperature which is well over 1000° F. for ordinary glasses. Additionally, a source of lithium ion is required, and generally speaking, lithium is the most expensive alkali metal of the group of potassium, sodium and lithium.

Another method of application is utilized in U.S. Pat. No. 3,287,200. Therein is disclosed a method of exchanging sodium ions in ordinary soda-lime-silica glass with potassium ions from an external source at temperatures below the strain point of the glass so as to generate a compressive stress at the surface, and tension stresses in the interior of the glass article. When a larger alkali metal ion replaces a smaller alkali metal ion in the surface layer of glass at a temperature that is below the strain point of the glass, the surface layer then has a compressional or compressive stress. Apparently, the larger ions try to occupy the smaller spaces previously occupied by the smaller alkali metal ions, thereby creating the compressional stress in the surface layer. Because the temperature of the glass is below the strain point, the glass structure cannot readjust itself to relieve the stress.

In U.S. Pat. 3,218,200 (Weber) there is disclosed a process for migrating potassium ions into the surface of a soda glass article with the potassium ions replacing sodium ions of the original glass. The process includes contacting the surface of the glass article with a molten potassium salt. The potassium salt is an electrolyte and contains an electrode connected to a D.C. voltage source. There is another electrode or electrolyte containing an electrode in contact with the opposite surface of the glass and connected to the cathode of the D.C. voltage source. When the D.C. current passes through the glass, the rate of migration of potassium ions into the surface of the soda glass is increased.

While these prior art methods generate substantial surface stress, they are somewhat commercially inexpedient in that it is necessary to immerse the article to be strengthened for substantial time periods (with or without the application of an electrical potential) in a molten salt bath containing the larger alkali metal ion to be diffused into the glass.

Accordingly, it is an object of the present invention to provide a method of chemically tempering alkali glass articles that does not require contact between the glass article to be strengthened and a molten salt bath.

Another object of the present invention is to provide a novel process for inducing a compressive stress layer on the surface of a soda glass article.

A further object is to provide a method of strengthening silica glasses containing $Na_2O$ by an ion exchange process in which the surface of a glass article is contacted with a potassium ion enriched gaseous plasma medium under the influence of an electrical potential.

And yet another object is to provide an economical method of inducing a surface compressive stress layer in soda containing glass compositions through a potassium for soda ion exchange process utilizing plasma ion exchange medium.

Yet another object is to provide a method of electrochemically tempering ordinary soda-lime-silica glass.

The above and other objects, features and advantages of the present invention will become more apparent from the following description and drawings wherein:

FIG. 1 is a schematic diagram, partly in section, of a system illustrating the methods of the present invention in which a glass article in the form of a tube is shown.

FIG. 2 is another schematic diagram, partly in section, illustrating the methods of the present invention in which a glass article in the form of a solid body is shown.

In attaining the object of this invention, one feature resides in exposing the heated surface of an alkali glass article to a conductive ionic plasma containing alkali ions of larger atomic radius than those alkali ions in the glass, applying an electrical potential between the glass surface and the gaseous plasma for a time sufficient for some of the potassium ions in the plasma to be driven (diffused into the glass surface under the influence of the thermal and electrical potentials) into the surface in exchange for sodium ions, and thereby create a surface compressive stress.

The apparatus illustrated schematically in FIG. 1 was used in the following examples. This schematic diagram illustrates a method of strengthening tubular glass articles in the form of bottles, jars, pipe, pipets, burets, beakers and the like. The drawing shows a tubular furnace 10 equipped with electrical heating elements 11. Tubes 12 and 13 are provided for furnace 10 to serve as supports for glass sample 14 that is in the form of a tube, and mounted within the furnace. The exterior surface of the glass sample is provided with an electrode in the form of an electrically conductive coating 15 such as a conductive silver paint or a tightly wraped metallic screening. This conductive coating 15 constitutes one of the two electrodes and is electrically connected to a direct current power source 16 through wire 17. The other electrode is in the form of an electrically conductive rod 18 of material that is non-reactive with the system components such as platinum, copper, carbon, tin and the like. Rod 18 is also electrically connected to the direct current power source 16 through wire 19.

Adjacent to the open end of support tube 13 is located a flame source in the form of a propane torch 20. Torch 20 is equipped with a regulating valve 21 and a nozzle 22. Nozzle 22 has mounted therein a small piece of inert wire (platinum) 23.

FIG. 2 illustrates schematically, apparatus for practicing the present invention when the glass article to be strengthened is a solid body such as a glass rod or glass sheet.

FIG. 2 shows tubular furnace or oven 50 equipped with electrical heating elements 51. Furnace 50 carries an electrically conductive sleeve 52 which comprises the positive electrode (cathode). Sleeve 52 is connected to a D.C. power source 53 through wire 54.

Mounted within sleeve 52 is a sample to be strengthened in the form of a glass rod 55. Glass rod 55 is also connected to D.C. power source 53 through wire 56 so that the glass rod itself comprises the negative electrode (anode).

Adjacent the lower end of sleeve 52 is located a flame source in the form of a propane torch 57. Torch 57 is equipped with a regulating valve 58 and nozzle 59. Nozzle 59 has mounted therein a small piece of inert wire (platinum) 60.

The electrochemical tempering of a solid glass rod such as a soda-lime-silica glass rod is accomplished by raising the furnace to a temperature of about 600° to 950° F. and applying suitable D.C. potential across the glass rod. The platinum wire 60 is coated with a potassium salt such as $KNO_3$, and the torch is ignited. The flames are directed into the sleeve to surround the glass rod with the flame dissociated ionic plasma. Under these conditions the current flow is established and the potassium ions are driven into the glass at the expense of sodium ions. A compressive surface stress layer is established by the ion exchange.

It is stated above that the present invention can be practiced in conjunction with alkali or alkali silicate glasses. These terms refer to silicate glasses containing at least about 2%, preferably at least about 5% by weight of alkali oxides such as $Li_2O$, $Na_2O$ and $K_2O$. In ordinary applications, the alkali oxide is usually soda ($Na_2O$) because of the great commercial importance of soda (or soda silicate) glasses. Soda glass compositions include for example soda-lime-silica, soda borosilicates, and soda magnesia silica.

Several other glass compositional fields suitable for use in practicing the present invention are disclosed in commonly assigned, copending application, Ser. No. 529,215, filed Feb. 23, 1966, the disclosure of which is incorporated herein by reference.

The process of the present invention includes the steps of generating an ionic gaseous plasma about the glass article to be strengthened, and maintaining an electrical potential between the plasma and the glass article, while the glass article is maintained at an elevated temperature.

The term "plasma," "ionic plasma," and "ion enriched gaseous plasma" are known in the art, are used herein and refer to an electrically conductive mixture of electrons and gaseous ions. For the purposes of the present invention, the gaseous ions are alkali cations. More specifically, ionic plasma contains the alkali ion immediately below the alkali ion of the glass, in Group I of the periodic table of elements. For instance, when the glass contains lithium, the plasma contains sodium, and when the glass contains sodium, the plasma contains potassium and so on.

The ionic plasma can be generated by any of several well known methods of producing ionic dissociation, such as arc discharge, glow discharge, ionic bombardment, sputtering and flame vaporization of appropriate ionic salts and compounds. Appropriate ionic salts include the halides (chlorides, bromides and iodides), sulfates, nitrates, phosphates, of lithium, sodium, potassium and the like. The gaseous carrier medium or vehicle for the plasma can be any non-interfering gas such as air, nitrogen, neon, argon and the like. In the examples, the gaseous carriers are the propane combustion gases.

Additional information on plasma technology can be obtained from standard references such as the NASA publication SP-5033 "Plasma Jet Technology" published October 1965.

In one particularly important embodiment of the present invention, the cation is the potassium ion, the gaseous medium is air and the soda glass is a soda-lime-silica glass. A convenient method of generating the potassium ionic plasma is the flame vaporization in air of ionic potassium salts such as $KNO_3$, $KCl$, $KBr$, $K_2SO_4$ and the like.

The elevated temperature maintained in this process for ion exchange is sufficiently below the softening point of the glass to avoid relief of the stress created when the potassium replace the sodium ions. The optimum ion exchange temperature is a function of the viscosity of the glass composition utilized in that the rate of ion exchange increases with increasing temperatures while the glass viscosity decreases with the increasing temperatures. At some temperature then, the viscosity will be reduced to the point where the glass structure will yield to accommodate the larger potassium ions as they diffuse into the glassy matrix and thereby relieve the stress.

Ion exchange temperatures lower than about 300° F. are usually too low to promote the necessary ion diffusion while temperatures more than about 100° F. above the annealing point are undesirable because of excessive stress relaxation. Between 300° F. and 100° F. above the annealing point temperature, the treatment time period ranges from about ½ minute to about 10 hours with the time varying inversely with temperature. Usually temperatures in the range of about 600° F. to about 950° F. for time periods ranging from about 1 minute to about 30 minutes are employed in the interest of economic practicality. Temperatures between the strain point and 100° F. above the annealing point may be utilized provided the time period is short enough to preclude substantial stress relaxation.

As is already known in the art, the time should not be too long; otherwise, there will be a diffusion of potassium ions to a greater extent than desired. The time should be long enough, however, to effectuate a compressional stress layer of at least about 10 microns in depth.

The terms "strain point," "annealing point," and "softening point" are used above. These terms refer to the glass viscosity and have definitions that are well known in the art. (For instance, see ASTM Test Designation C336–64T.)

The electrical field strength required depends on the depth and magnitude of the stress desired. It will be seen, that both the stress depth and stress magnitude increase with increasing field strength. It is to be understood that the minimum field strength is that voltage required to cause a current flow through the particular plasma. The maximum field strength is limited by the dielectric properties of the glass article being strengthened.

The following examples will more specifically define the principle of the present invention although they should not be interpreted by way of limitation.

EXAMPLE 1

A sample of stress-free, soda-magnesia-silica glass tubing (1" O.D. x 6" length with a wall thickness about 1 mm.) of glass composition A was mounted in experimental apparatus illustrated in FIG. 1 and described above.

Glass composition A

| Component: | Percent by weight |
| --- | --- |
| $SiO_2$ | 72 |
| $Al_2O_3$ | 3 |
| MgO | 10 |
| $Na_2O$ | 15 |
| Liquidus temperature (° F.) | 1750 |
| Log 4 viscosity temperature (° F.) | 2020 |
| Annealing point temperature (° F.) | 1000 |

The power source 16 was connected so that the internal electrode 18 was the anode (positive) and the external electrode 15 was the cathode (negative). The external electrode 15 was in the form of conductive silver paint.

After the glass sample had been mounted, the furnace temperature was raised to about 900° F. and the power source was set so as to impress an electric field of about 1300 volts per cm. of glass thickness across the glass.

The platinum wire 23 at the torch nozzle 22 was then heated to red heat and coated with $KNO_3$ which adhered to it, dissociated in the flame, and was carried away by the burning gases. The flames were directed into the open end of support tube 13 to generate a potassium ion enriched plasma in the vicinity of electrode 18. A current of about 5–15 ma. began to flow through the completed electrical circuit.

The flame was turned off after 30 seconds of operation to avoid heating the glass to the point where stress relaxation would occur and the circuit was broken. The flame remained off for 30 seconds, at which time it was reignited and the circuit was again established. This cycle (30 seconds "on" and 30 seconds "off") was repeated until 2½ minutes of ion exchange or "on" time was accumulated. The tubing was then cooled and removed from the furnace.

The sample tube was cut into cross sectional pieces and examined by well known optical techniques to determine the depth, type, and degree of stress throughout the cross section. The stress characteristics were measured as a function of birefringence using a graduated quartz wedge (prism) calibrated in millimicrons. Cross sectional pieces of the exchanged tube were cut from the tube using an ordinary circular diamond saw. Such saws are common in the glass industry. The thickness of the cross sectional piece was measured in the direction parallel to the original axis of the tube sample. The measured cross sectional piece was then mounted in matched index fluid (e.g. oil having the same index of refraction as glass) on the stage of a polarizing microscope so that the polarized light would pass through the measured dimension. The polarizer was contained in the optic system below the microscopic stage.

The polarized light passing through the measured cross sectional test piece was then received in an eye piece equipped with the calibrated quartz prism. The optic lag (retardation), expressed in terms of millimicrons retardation per unit cross sectional thickness of the test specimen, was then obtained by reading the calibrated prism. The depth of the stress layer was measured to the neutral stress axis with an eye piece calibrated in microns.

The degree of surface stress was approximated based on the assumption that the stress-optical coefficient for the compositions studied was about $$2 \frac{\text{pounds}}{(\text{mu}) (\text{inch})}$$

The degree of surface stress reported is then only an aproximation because the stress optical coefficient is known to depend on glass composition, and there is a compositional gradient established by the ion exchange treatment itself. The calculation, then, expressing the degree of stress can be expressed as follows:

Stress in p.s.i.=optical retardation $$\left(\frac{\text{mu}}{\text{inch}}\right) \times \text{stress optical coefficient} \left(\frac{2 \text{ pounds}}{\text{mu inch}}\right)$$

The sample ring section was evaluated and was found to have a maximum surface compressive stress of about 2500 p.s.i. The depth of the compressive stress layer was about 150 microns.

As a control, an article of glass composition A was immersed in a molten $KNO_3$ bath at 800° F. for 1 hour. The sample was observed to have a stress depth of about 5 microns in depth.

EXAMPLE 2

The glass tubing composition and method of Example 1 were employed in the three experimental runs set forth below except that the accumulated ion exchange time was 3 minutes.

| Electric field across glass-volts/cm. | Maximum compressive stress in p.s.i. | Depth of compressive stress in microns |
| --- | --- | --- |
| 880 | 1,700 | 66 |
| 980 | 2,400 | 83 |
| 1,300 | 3,100 | 87 |

The above data indicates that the depth of ion exchange as well as the magnitude of the stress induced can be controlled by controlling the intensity of the electrical field. It is seen that both the depth of penetration and the magnitude of the stress induced, increased with increasing electrical field strength.

EXAMPLE 3

The glass tubing composition, method and apparatus of Example 1 were employed except that the conductive silver paint coating was replaced by a tightly wrapped layer of fine copper screen on the exterior of the glass tubing sample and the furnace temperature at 750° F. instead of 900° F.

Exemplary results are set forth below.

Electric field across glass, volts/cm. _____ 1600
Maximum compressive stress in p.s.i. _____ 4500
Depth of compressive stress in microns _____ 100

EXAMPLE 4

Glass tubing of composition A was ion exchanged for a period of 3 minutes at 800° F. according to the method of Example 3.

The results are set forth below.

Electric field across glass, volts/cm. _____ 1000
Maximum compressive stress in p.s.i. _____ 10,000
Depth of compressive stress in microns _____ 150

EXAMPLE 5

A sample of stress-free, soda-lime-silica glass tubing of composition B having the following composition and properties was mounted in experimental apparatus as shown in FIG. 1. The sample was 1" O.D. x 6" in length and had a wall thickness of about 1 mm.

The tubing was subjected to an ion exchange treatment similar to that described in Example 3.

Glass composition B

| Component: | Percent by weight |
| --- | --- |
| $SiO_2$ | 68 |
| $Al_2O_3$ | 3 |
| CaO | 6 |
| MgO | 4 |
| $Na_2O$ | 15 |
| $K_2O$ | 1 |
| BaO | 2 |
| $B_2O_3$ | 1 |

Annealing point temperature (° F.) _____ 970

The accumulated ion exchange time was 5 minutes and the temperature was 750° F. The experimental results are set forth below.

Electric field across glass, volts/cm. _____ 410
Maximum compressive stress in p.s.i. _____ 16,000
Depth of compressive stress in microns _____ 55

EXAMPLE 6

In this example a compressive stress layer was generated on the exterior surface of a glass tubing sample of composition B by the following method. The glass tubing sample was mounted in an apparatus similar to that shown in FIG. 1 except the polarity of the circuitry was reversed so that the exterior electrode (in the form of a fine mesh copper screening wrapped loosely around the tubing so as to form an annular gap of about ⅛ inch between the tubing and the screen) was the anode (positive electrode) and the interior electrode was the cathode (negative electrode).

The furnace temperature was maintained at 750° F. and the electric field across the glass tubing was about 1600 volts/cm. A flame dissociated $KNO_3$ plasma was applied to the exterior surface of the glass sample perpendicularly through the exterior electrode using the 30 second application cycle described in Example 1, until 2½ minutes of ion exchange time had been accumulated.

The tubing sample was then subjected to the stress analysis described above. The maximum surface compressive stress was observed to be about 1200 to 1500 p.s.i. and the stress depth was about 100 microns.

This example demonstrates that the glass tubing sample can be tempered on either or both surfaces according to the specifications of the intended use.

For the purposes of comparison, two types of experimental controls were run.

Sample control 1—The procedures of Examples 1 through 6 were duplicated except that no electric field was applied.

In each case the maximum compressive stress induced was less than 2000 p.s.i. and the depth of the stress layer was less than about 5 microns.

Sample control 2—The procedures of the Examples 1 through 6 were duplicated except that no $KNO_3$ was present in the burning gases issuing from the propane torch.

In each case the maximum compressive stress induced was less than 2000 p.s.i. and the depth of the stress layer was less than about 5 microns. The stress was observed to be thermal stress generated through the presence of the hot gases.

From the foregoing, it will be appreciated by those skilled in the art that this invention provides a novel method of tempering glass compositions containing alkali oxides (particularly soda glass compositions) by an ion exchange mechanism that is accomplished through an ionic plasma medium instead of a molten salt bath.

I claim:

1. A method of inducing a compressive stress layer on the surface of a solid alkali silicate glass-shaped article wherein the alkali glass is soda glass containing at least 2% by weight of soda ($Na_2O$) comprising the steps of:

heating the surface of the shaped glass article to an elevated temperature below the softening point of the glass but at a temperature sufficiently high to permit ion exchange and which is greater than about 300° F., bringing said solid shaped glass surface at said elevated temperature into contact with and surrounding said glass surface with an ion exchange medium which consists of an ion-enriched, gaseous plasma at a sufficiently high temperature, the plasma containing larger alkali ions than those present in the alkali silicate glass, the ions in said plasma being electrically conductive at said sufficiently high temperature, applying a D.C. potential across the glass with a minimum field strength whereby the voltage is sufficient to cause a current flow through the plasma towards the glass surface, passing an electrical current through said gaseous plasma and through the glass article which is at an elevated temperature sufficient to be at least partially electrically conductive and for a sufficient period of time ranging from about one-half minute to about ten hours whereby only some of the alkali metal ions of the glass in the surface layer of the glass exchange for the larger alkali ions of the ion-enriched plasma to provide a compressive surface stress layer in the glass article, but for a time insufficient to provide such ion exchange to a substantial degree in the interior portion of the glass article, and for a time insufficient to provide substantial stress relaxation of said glass article in the surface layer.

2. The method of claim 1 wherein the soda content of the glass composition is greater than about 5% by weight, and the elevated temperature is in the range of about 600° F. to about 900° F. while the time period of the ion exchange ranges from about 1 minute to about 30 minutes.

3. The method of electro-chemically tempering a solid, shaped, soda silicate glass article at an elevated temperature below the softening point of the glass but sufficiently high to permit potassium ions from an external source to be exchanged for sodium ions present in the surface of the glass article, the improvement which comprises:

contacting and surrounding the glass surface with an ion source which is the only source of external ions and which is a potassium ion-enriched plasma at a sufficiently high temperature whereby it is electrically conductive, and maintaining said plasma at a positive electrical potential with respect to said glass article by maintaining a minimum field strength of sufficient voltage to cause a current flow through the plasma to the glass surface so that the potassium ions from the plasma are controllably exchanged with the sodium ions in the glass article, but for a time insufficient to provide an ion exchange to a substantial degree in the interior portion of the glass article and for a time insufficient to provide substantial stress relaxation of said glass article in the surface layer.

4. The improvement of claim 3 wherein the glass article is maintained at a temperature greater than about 300° F. and less than about 100° F. above the annealing point of the glass and the time period for the ion exchange ranges from about one-half minutes to about 10 hours.

5. The improvement of claim 3 wherein the soda content of the glass composition forming the article is greater than about 5% by weight and the temperature of the glass is maintained within a range of 600° F. to about 950° F. and the time period of the ion-exchange ranges from about 1 minute to about 30 minutes.

6. A method of inducing a compressive stress layer on the surface of a solid alkali metal silicate glass article containing at least 2 weight percent alkali metal oxide comprising the steps of:
   (a) heating said article to a temperature of from about 300° F. up to about 100° above the annealing point temperature of the glass,
   (b) contacting the heated surface of the glass article and surrounding said article with an ion-enriched, gaseous plasma containing alkali ions which are larger than the alkali ions present in said alkali silicate glass, said plasma being at a sufficiently high temperature whereby it is electrically conductive, and simultaneously,
   (c) maintaining a minimum field strength voltage across the glass and the plasma whereby there is caused a current flow through the plasma toward the glass article for a period of time sufficient for the smaller alkali metal ions in the surface of said glass to be exchanged for the larger alkali ions of said gaseous plasma ion exchange medium but for a time insufficient to provide an ion exchange to a substantial degree in the interior portion of the glass article and for a time insufficient to provide substantial stress relaxation of the glass in the surface layer, the process thereby forming a compressive surface stress layer which is at least 10 microns in depth.

7. A method of inducing a compressive stress layer on the exterior surface of a solid alkali metal silicate glass article comprising the steps of:
   bringing said glass surface into contact with and surrounding the exterior surface of said article with an ion-enriched gaseous plasma, said plasma containing larger alkali metal ions than those present in the alkali metal silicate glass,
   heating the surface of the glass to an elevated temperature below the softening point of the glass but sufficiently high to permit ion exchange,
   applying an electrical potential between the glass article and the gaseous plasma for a time sufficient for some of the alkali metal ions in the plasma to be driven into the surface in exchange for the alkali metal ions in the glass surface, the temperature of the gaseous plasma ion exchange medium being sufficiently high so that it becomes electrically conductive,
   the ion exchange being carried out for a time insufficient to provide such ion exchange to a substantial degree in the interior portion of the glass article and for a time insufficient to provide substantial stress relaxation of the glass in the surface layer.

8. The method as defined in claim 7 wherein the temperature of the exchange is not above the strain point of the glass.

References Cited

UNITED STATES PATENTS

| | | | |
|---|---|---|---|
| 3,505,047 | 4/1970 | Plumat | 65—30 |
| 3,505,048 | 4/1970 | Plumat | 65—30 |
| 3,505,049 | 4/1970 | Plumat | 65—30 |
| 3,486,995 | 12/1969 | Evers | 65—30 |
| 3,586,521 | 6/1971 | Duke | 65—30 |

OTHER REFERENCES

Translation French Article by Leclerc, "Diffusion Characteristics of Mobile Ions in a Vitreous Network," pp. 1 to 21.

FRANK W. MIGA, Primary Examiner

U.S. Cl. X.R.

65—32, 157, 111, 113, 120, 284